United States Patent [19]

Kawamura

[11] Patent Number: 5,552,931
[45] Date of Patent: Sep. 3, 1996

[54] FINDER OPTICAL SYSTEM

[75] Inventor: Kazuteru Kawamura, Hino, Japan

[73] Assignee: Olympuus Optical Co., Ltd, Tokyo, Japan

[21] Appl. No.: 85,162

[22] Filed: Jul. 2, 1993

[30] Foreign Application Priority Data

Apr. 6, 1992 [JP] Japan ........................... 4-84137

[51] Int. Cl.$^6$ ............................. G02B 23/00; G03B 13/10
[52] U.S. Cl. ........................ 359/431; 359/421; 359/422; 354/222
[58] Field of Search ...................... 359/362, 421, 359/422, 431, 434–435, 676, 831, 833–837; 354/219, 222–225, 155, 152, 75–79

[56] References Cited

U.S. PATENT DOCUMENTS

| 4,131,354 | 12/1978 | Hagiwana | 354/222 |
|---|---|---|---|
| 4,887,109 | 12/1989 | Fujila et al. | 354/222 |
| 4,949,107 | 8/1990 | Kilagrshi et al. | 354/155 |
| 5,021,815 | 6/1991 | Harvey | 354/222 |
| 5,144,349 | 9/1992 | Kalo et al. | 354/222 |
| 5,194,886 | 3/1993 | Mukai et al. | 354/222 |
| 5,257,055 | 10/1993 | Cho et al. | 354/222 |
| 5,321,457 | 6/1994 | Imaizuul | 359/434 |

OTHER PUBLICATIONS

Hideyuki Abe, "Making Of Picture Of Panoramic Photographic", Photographic Industries, Feb. 1991, p. 38 vol. 49, No. 2, Shashin Kogyo Publishing Co., Ltd.

Photographic Industires, Jan. 1992, pp. 42 & 45, vol. 50, No. 1, Shashin kogyo Publishing Co., Ltd.

*Primary Examiner*—Thong Q. Nguyen
*Attorney, Agent, or Firm*—Cushman, Darby & Cushman

[57] ABSTRACT

A finder optical system includes a finder objective lens provided independent of a photographic objective lens, an image erecting unit for erecting an image formed by the finder objective lens, and an eyepiece. The distance from a surface, closest to an image, of the finder objective lens to a surface, closest to an object, of the eyepiece is changed and at the same time, the focal length of the eyepiece is also changed, thereby converting the state of ordinary photography into the state of panoramic photography. Thus, in the panoramic photography, aberration is favorably maintained and finder magnification is improved.

8 Claims, 7 Drawing Sheets

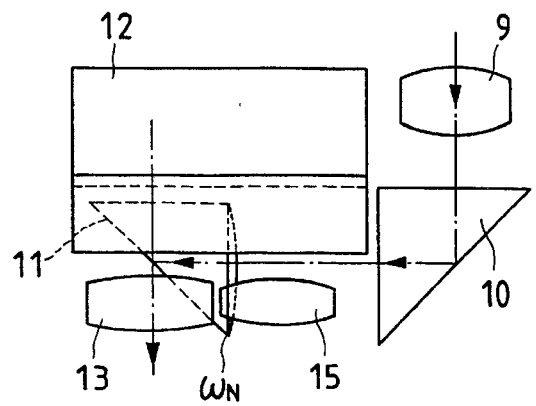
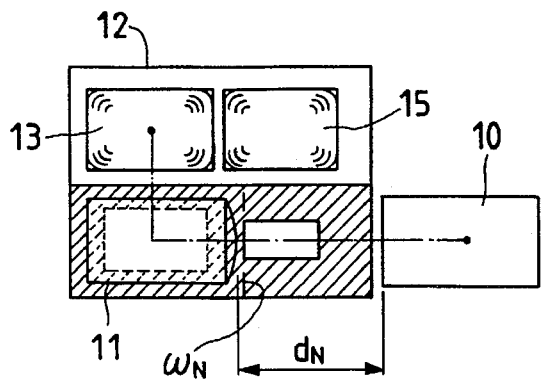
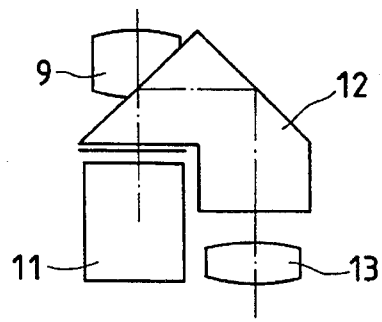
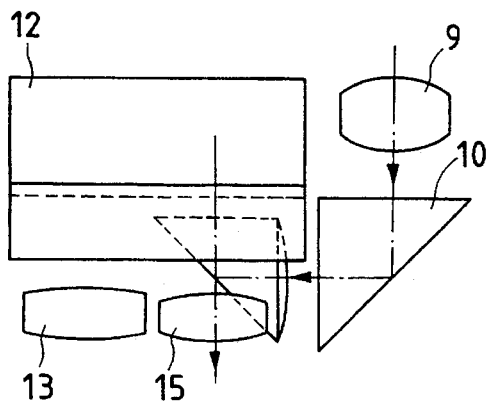
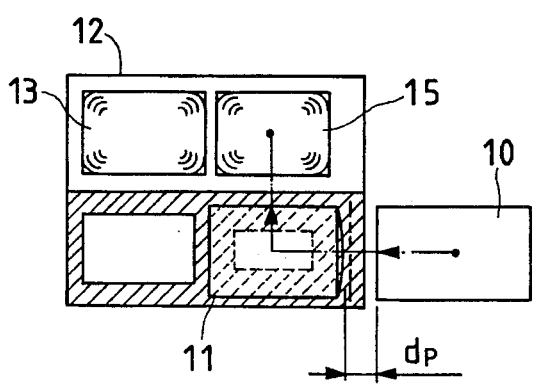

PUPIL DIAMETER=4mm
(DIOPTER)

ω=10.1°
(DIOPTER)

ω=10.1°
(%)

PUPIL DIAMETER=4mm
(DIOPTER)

ω=10.1°
(DIOPTER)

ω=10.1°
(%)

PUPIL DIAMETER=4mm (DIOPTER)

ω=11°

(DIOPTER)

ω=11°

(%)

PUPIL DIAMETER=4mm (DIOPTER)

ω=11°

(DIOPTER)

ω=11°

(%)

FINDER OPTICAL SYSTEM

BACKGROUND OF THE INVENTION

1. Field of the Invention

This invention relates to cameras which can function in either an ordinary or panoramic mode and, in particular, to a finder optical system for a camera which permits ordinary and panoramic photographs to be taken, independently of a photographic optical system.

2. Description of the Related Art

Recently, cameras for 35 mm film have been able to trim the upper and lower portions of the image photographed on the film by placing a light-blocking plate adjacent to the upper and lower portions of a film surface within the camera. In this way, the image on a photographic film or print can be made long sideways, and thus panoramic photography that enhances such a wide-screen sensitivity has been popularized.

Real image mode finders used in cameras which can thus bring about the states of ordinary and panoramic photographies for 35 mm full size are available in two types in connection with field frames. One is such that the frames indicative of a field range for ordinary photography and a field range for panoramic photography narrowed vertically are superposed and marked on the same field frame, which is disposed at the intermediate imaging plane of the finder optical system. In ordinary photography, a photographer recognizes the photographic range with the frame for ordinary photography, while in the panoramic photography, he does it with the frame for panoramic photography. In either state of photography, however, an image produced within the field range of the finder remains unchanged. As such, the photographer, after making sure which state of photography is desired, must determine which frame indicates the corresponding photographic range. The other type of real image mode finder, by contrast, is such that a single field frame whose shape varies according to the state of photography is disposed at the intermediate imaging plane. In ordinary photography, the field frame assumes the shape indicative of the photographic range of the state of ordinary photography, while in the panoramic photography, it changes to the shape indicative of the photographic range of the state of panoramic photography in accordance with the switching operation of the camera. Additionally, in panoramic photography, the horizontal length of the field frame is set to be longer than that in ordinary photography so that the exit angle of an eyepiece increases. The photographer can thus make sure, through the finder, that a panoramic picture will actually be taken and printed out. In this case, the focal length of the objective lens of the finder is increased in proportion to the increment of the horizontal length of the field frame, and the finder magnification is raised. This reason is as follows: an actual photographic range in panoramic photography is such that the vertical length of the field frame is reduced to a half of that in ordinary photography, while the horizontal length remains unchanged. Thus, if the focal length of the objective lens of the finder in the panoramic photography is set to be identical with that in the ordinary photography, the photographer will see the field frame of a wider photographic range than the actual one through the finder.

In the case of the former type of real image mode finder, however, both field frames will be viewed in both ordinary and panoramic photography. Hence, the photographer, when viewing through the finder, cannot determine which state of photography of the camera is in. This is very troublesome.

In addition, although in the state of panoramic photography provision is made to give the corresponding indication within the finder, the photographer will be likewise liable to incorrectly identify the photographic range. Since the visual field in the state of panoramic photography is identical with that in the ordinary photography where the vertical length is merely reduced, the photographic range may be recognized, but the state of an actually printed picture is difficult to imagine. This causes the drawback that a case may arise in which the photographer's intention cannot be sufficiently reflected in the picture. In this sense, it is therefore said that the provision of a wide angle of view for the field frame is of importance to proper panoramic photography.

In the latter type of red image mode finder, in contrast, the field frame is designed so that its dimension and shape change with the state of ordinary or panoramic photography. Consequently, the photographer, when seeing through the finder, can know at a glance as to which state of the camera is brought about, and the problems described in the former type of finder are not caused. Further, in the panoramic photography, since the horizontal length of the field frame is increased so that the field frame is intended for the wide angle of view, the state of the printed picture corresponding to the wide angle of view of the objective lens can easily be imagined through the finder. In the panoramic photography, however, as mentioned above, there is the necessity for increasing the focal length of the objective lens of the finder compared with that in the ordinary photography, and thus the following difficulties are encountered. First, where the camera used is a single focusing camera, it becomes impossible to construct the objective lens of the finder with a single lens. For this reason, it is required that a concave lens is inserted in, or removed from, the objective lens to change the focal length. This inevitably increases the overall length of the finder. Second, where a zoom-lens camera is employed, the finder needs a zooming region satisfying both states of ordinary and panoramic photographies. Specifically, for example, if the horizontal length of the field frame in panoramic photography is set 1.2 times as long as that in ordinary photography, the variable magnification ratio of the finder will be required to be 1.2 times as high as that of the camera in ordinary photography only. Recently, however, in a compact zoom camera, the thickness has been minimized. In view of this development, if the finder is intended for reduction of the overall length, an increment of 1.2 times in the variable magnification ratio in addition to a zoom ratio will cause an increase in aberration or distortion and will render the finder's performance very disadvantageous. Thus, when the minimization of thickness of the camera is taken into account, the construction of the latter type of finder has the problem that the overall length of the finder is difficult to reduce and the amount of aberration or distortion increases.

SUMMARY OF THE INVENTION

It is, therefore, an object of the present invention to provide a finder optical system in which the overall length of the finder and the amount of aberration or distortion is reduced, while the finder magnification can be increased.

The finder optical system according to the present invention has a finder objective lens provided independent of a photographic objective lens, image erecting means for erecting an image formed by the finder objective lens, and an eyepiece. By changing the distance between a surface, closest to the image side, of the finder objective lens and a surface, closest to the object side, of the eyepiece, followed by the focal length of the eyepiece, the state of ordinary photography is converted to the state of panoramic photography.

Here, in accordance with FIGS. 1A and 1B, the principal of the present invention is explained. In FIG. 1A, an objective lens 1 of zoom structure is disposed on the object side of the finder optical system, and a first reflecting member 2 for erecting an inverted image to be formed by the objective lens 1 is provided behind the objective lens 1 (on the eyepoint side). A second reflecting member 3 for erecting the image is spaced a distance dN apart along the optical axis from the exit surface of the first reflecting member 2, and the real image of the objective lens 1 is formed on the entrance surface of the second reflecting member 3 (an intermediate imaging plane FN). A field frame ωN is placed adjacent to the imaging plane and shaped into a form indicative of the photographic range for ordinary photography. Subsequently to the second reflecting member 3, a combined third and fourth reflecting member 4 is disposed for erecting likewise the image. These three reflecting members 2, 3, and 4 have at least four reflecting surfaces in total and constitute image erecting means. Further, an eyepiece 5 for ordinary photography is disposed behind the reflecting member 4 and can be replaced, in accordance with the switch in the state of photography, with an eyepiece 6 for panoramic photography which is less in focal length than the eyepiece 5 and situated outside of the optical path. In the rear of the eyepiece 5, an eyepoint 7 is provided at which a pupil can be located.

In the arrangement for panoramic photography shown in FIG. 1B, the second reflecting member 3 is moved to the position where the distance dN from the first reflecting member is reduced to a distance dP. Consequently, the real image to be formed by the objective lens 1 (is made closer to the eyepiece and) is created on an intermediate imaging surface FP in the vicinity of the entrance surface of the combined third and fourth reflecting member 4. Adjacent to this position, a field frame ωP will be located in the shape indicative of the photographic range for panoramic photography. The eyepiece 6 will be located in the optical path behind the reflecting member 4. Also, in this diagram, when the distance between the first reflecting member 2 and the second reflecting member 3 is reduced to the distance dP, the subsequent optical systems also appear to move toward the object. The present invention, however, (as will be described later) is constructed so that these optical systems do not necessarily move and the total length of the finder optical system remains unchanged.

Calling $f_{ln}$ the focal length of the eyepiece 5 in the ordinary photography, $f_{lp}$ the focal length of the eyepiece 6 in the panoramic photography, mN the finder magnification in the ordinary photography, and mP the finder magnification in the panoramic photography, it is desirable that the finder optical system satisfies the equation $$1 \leq f_{ln} \, m_N/(f_{lp} \, m_P) \leq 2 \tag{1}$$

In the real image mode finder, it is common practice to use a field lens in the neighborhood of the intermediate imaging plane in order to facilitate the pupil transmission of the objective lens and the eyepiece. If, however, the value of Eq. (1) is smaller than the lower limit, the pupil transmission becomes difficult and favorable aberration is not derived. Beyond the upper limit, the difference between the positions of the eyepoint 7 in ordinary and panoramic photography becomes greater and the finder is very difficult to see.

Where the finder optical system has indications, such as an AF target mark and a parallax correcting frame, within the visual field in short-distance photography, these indications are provided on the image planes FN and FP in ordinary and panoramic photography, respectively. In this case, it is desirable that the finder optical system satisfies the equation $$(d_N - d_P)/f_{LN} \geq 0.15 \tag{2}$$

where $f_{LN}$ is the focal length of the optical system (eyepiece) behind the intermediate imaging plane FN in the ordinary photography. If the lower limit of Eq. (2) is passed and one photography is performed, the indication, such as an AF target mark or a parallax correcting frame, for the other photography will be liable to see, which situation is unfavorable.

The present invention is constructed as mentioned above. Thus, in the state of ordinary photography shown in FIG. 1A, a field beam of light passing through the objective lens 1 traverses the first reflecting member 2 and forms the real image at the intermediate imaging plane FN adjacent to the entrance surface of the second reflecting member 3. The light beam, through the field frame ωN, further traverses the second reflecting member 3 and the combined third and fourth reflecting member 4, so that the image is erected. In this way, the photographer can observe the image, through the eyepiece 5, within the field range for ordinary photography at the eyepoint 7. When the operation is changed over to the state of panoramic photography, the eyepiece 6, instead of the eyepiece 5, is brought into the optical path, and the distances on the optical path are diminished, from the objective lens 1 to the second reflecting member 3, the combined reflecting member 4, the eyepiece 6, and the eyepoint 7. Thus, the second reflecting member 3 is located at the distance dP from the first reflecting member 2. The field frame ωP is also moved near the entrance surface of the combined reflecting member 4, and its photographic range is converted. By changing the distance between the rear surface of the objective lens 1 and the eyepiece, the finder optical system will form the intermediate image at the plane FP adjacent to the entrance surface of the combined reflecting member 4. Hence, because the intermediate imaging plane FP for panoramic photography can be made closer to the eyepiece than the intermediate imaging plane FN for ordinary photography, favorable aberration will be obtained even though the focal length of the eyepiece 6 for panoramic photography is less than that of the eyepiece 5 for ordinary photography. As such, without increasing the focal length of the objective lens 1 in the panoramic photography, high finder magnification is secured and the field frame can be designed for the wide angle of view. The photographer, when viewing through the finder, can thus imagine easily what the printed picture will look like. In this case, the arrangement of the finder optical system, which dispenses with the need for changing the focal length of the objective lens 1, is very advantageous to the reduction of the total length of the objective lens 1.

The variable distance dN or dP is secured, according to the state of photography, between the first and second reflecting members 2 and 3 within the image erecting means which is capable of erecting the image by reflecting the light beam in the direction normal to the optical axis. Thus, when the conversion between the ordinary photography and the panoramic photography is made, the distances dN and dP can be changed to each other by only moving at least the second reflecting member 3, and it is possible to obtain the arrangement in which the overall length of the finder optical system changes relatively little.

Further, the positional difference between the intermediate imaging planes FN and FP for ordinary and panoramic photographies facilitates the indications corresponding to respective photographies. Specifically, for instance, where the parallax correcting frames are indicated within the visual field, if the planes FN and FP are located at the same position, it is necessary to indicate the correcting frames for ordinary and panoramic photographies at this same position. This makes the photographer liable to confuse the frames in observation. In the present invention, by contrast, the positions of the intermediate imaging planes, as defined in Eq. (2), have a large difference between the ordinary and panoramic photographies. Since, in the state of one type of photography, the correcting frame in the other photography oversteps the limit for the diopter adjusted to the eye and is invisible, such inconvenience as mentioned above is not caused.

With respect to the changeover means of the focal length of the eyepiece, instead of interchanging a plurality of eyepieces 5 and 6, it is possible to use a liquid crystal lens or an elastic lens to alter its shape for the changing of the focal length. Alternatively, the refractive index of the eyepiece can be changed by insertion of liquid material, thereby switching the state of photography.

This and other objects as well as the features and advantages of the present invention will become apparent from the following detailed description of the preferred embodiment when taken in conjunction with the accompanying drawings.

BRIEF DESCRIPTION OF THE DRAWINGS

FIGS. 7A, 7B, and 7C are plan, rear, and side views, respectively, showing a second arrangement example in the state of ordinary photography;

FIGS. 8A and 8B are plan and rear views, respectively, showing the second arrangement example in the state of panoramic photography;

FIG. 12A showing spherical aberration, FIG. 12B showing astigmatism, and FIG. 12C showing distortion, respectively, with panoramic photography in the telephoto position.

DETAILED DESCRIPTION OF THE PREFERRED EMBODIMENT

Figure 1A:
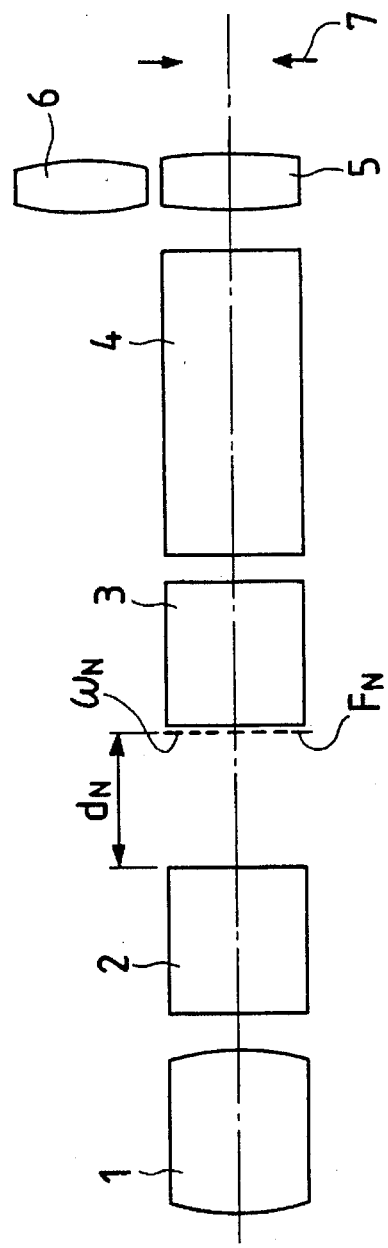
FIGS. 1A and 1B are developed views showing fundamental arrangements in the states of ordinary and panoramic photographies, respectively, of the finder optical system according to the present invention.
Figure 1B:
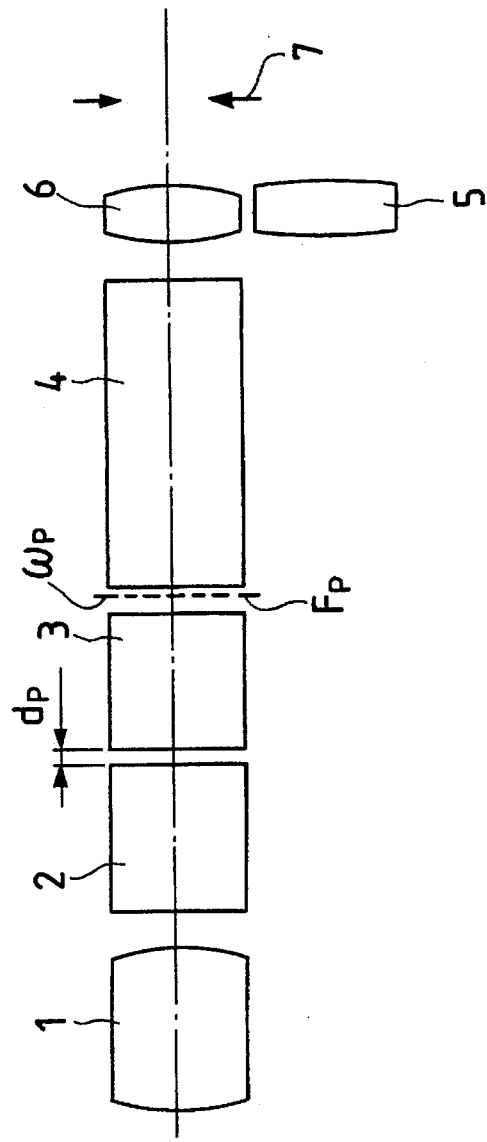

Referring to the drawings shown, the preferred embodiment of the present invention will be explained in detail below.

Figure 2A:
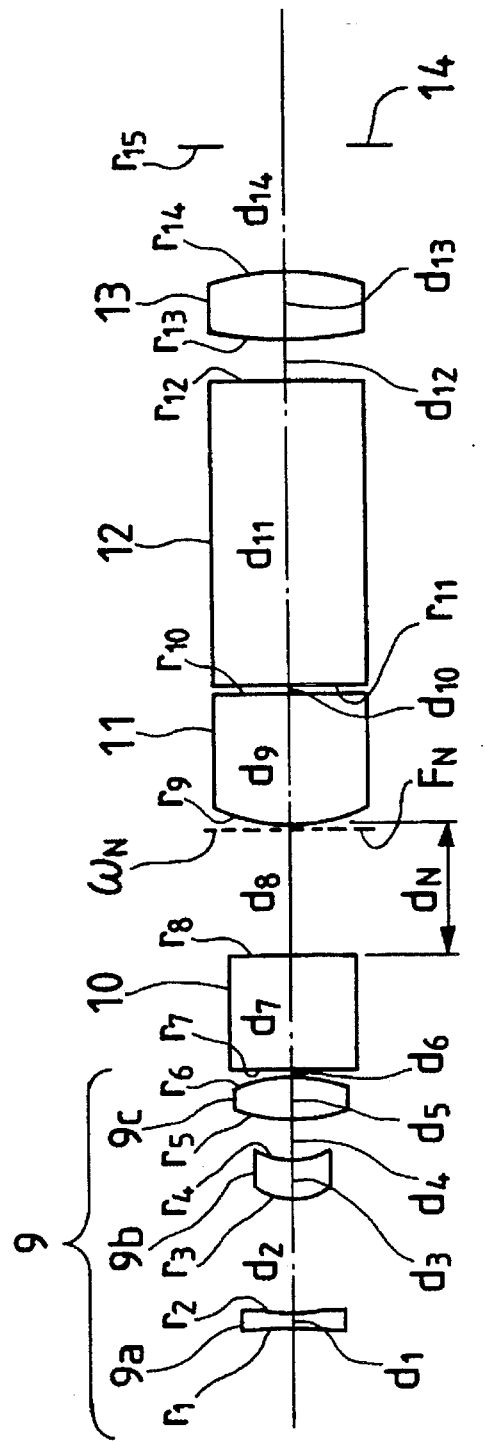
FIGS. 2A, 2B and 3A, 3B are views showing arrangements relative to the wide angle position and the telephoto position in the ordinary and panoramic photographies, respectively, of an embodiment of the finder optical system according to the present invention.
Figure 2B:
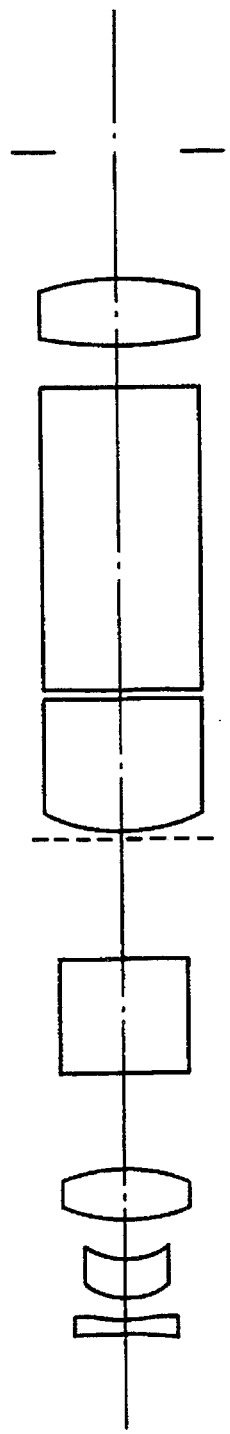

In the variable magnification finder optical system for ordinary photography as shown in FIGS. 2A and 2B, an objective lens 9 of zoom structure includes three components arranged in the order from the object side: a fixed negative lens 9a, a movable positive lens 9b, and a movable positive lens 9c. When zooming is performed from a wide angle state (as shown in FIG. 2A) to a telephoto state (as shown in FIG. 2B), the positive lenses 9b and 9c will move toward the negative lens 9a on the object side. Here, the positive lens 9b located at the middle position is constructed, as a meniscus lens having a convex surface on the object side, to have the action of minimizing the decrease of magnification from the wide angle position to the telephoto position by locating the principal point of the lens as near to the object as possible. The powers of the negative lens 9a and the positive lens 9c on both sides can thus be much improved and, by moving the positive lens 9c toward the image plane, the action of maximizing the increase of magnification can be secured. Moreover, the total thickness of the objective lens from the negative lens 9a to the positive lens 9c can be made very small, and an F back (the distance from a surface, nearest the image plane, of the objective lens 9 to the image plane) can be increased.

A first reflecting prism 10 for erecting the image is disposed behind the objective lens 9, a second reflecting prism 11 is spaced the distance dN apart from the rear end surface of the prism 10, and a combined third and fourth reflecting prism 12 is disposed behind it to erect the image. The real image to be formed by the objective lens 9 is created at the entrance surface of the second reflecting prism 11 (the image plane FN), and the field frame ωN providing the field range for ordinary photography is placed directly before the entrance surface. An eyepiece 13 followed by an eyepoint 14 is disposed behind the combined prism 12.

Figure 3A:
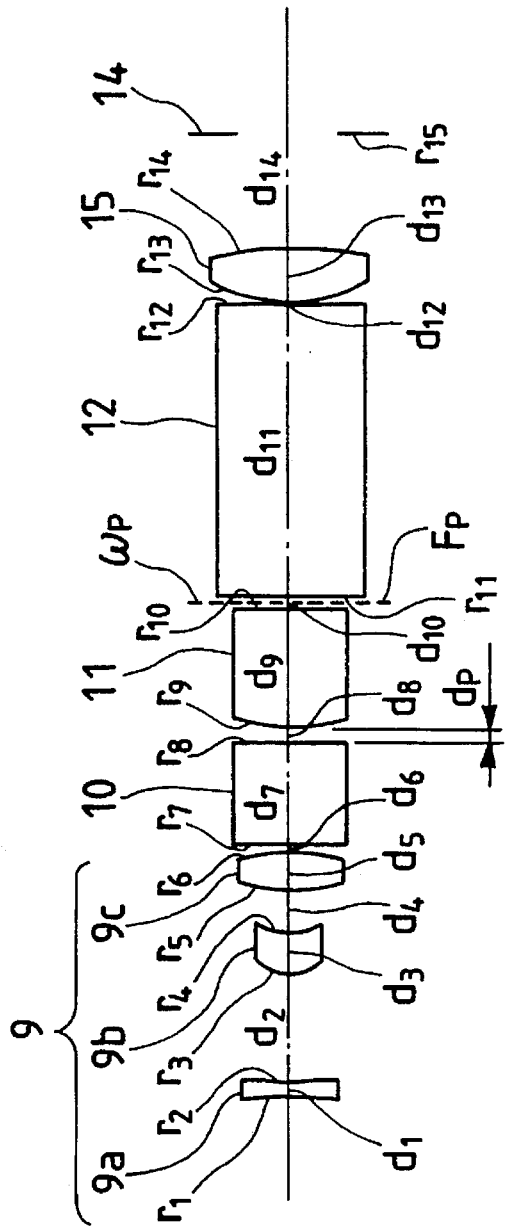
Figure 3B:
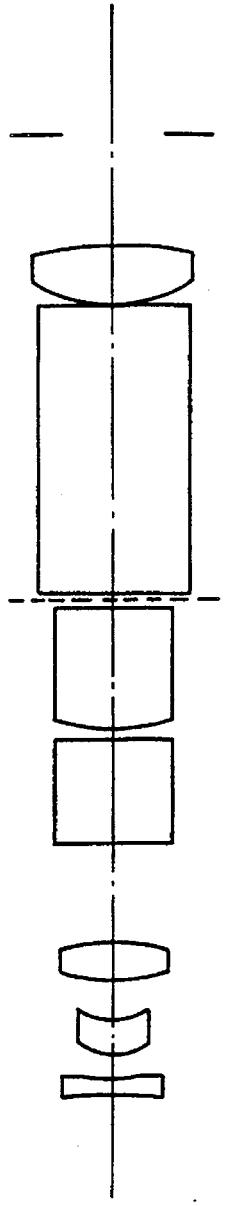

In the arrangement for panoramic photography shown in FIGS. 3A and 3B (the wide angle position being shown in FIG. 3A and the telephoto position being shown in FIG. 3B), the second reflecting prism 11 is positioned so that the distance from the first reflecting prism 10 is the distance dP and at the same time, the subsequent optical systems are likewise made closer to the object, thereby locating the intermediate imaging plane FP in the vicinity of the entrance surface of the combined third and fourth reflecting prism 12. The field frame ωP is situated directly before the entrance surface of the combined prism 12 and at the same time, is changed to the shape indicative of the field range for panoramic photography in which the horizontal length is greater. Further, the eyepiece 13 is replaced by the eyepiece 15 of a smaller focal length and thereby a finder magnification of 1.2× is obtained.

Since the embodiment of the present invention is constructed as stated above, the light beam passing through the objective lens 9 in the state of ordinary photography shown in FIGS. 2A and 2B forms the real image, through the first reflecting prism 10, on the intermediate imaging plane FN at the entrance surface of the second reflecting prism 11. The image whose field range is set by the field frame ωN is erected through the second and combined prisms 11 and 12 and can be observed through the eyepiece 13 at the eyepoint 14.

Next, where the ordinary photography is changed over to the panoramic photography, the distance dN between the first reflecting prism 10 and the second reflecting prism 11 is reduced to the distance dP and at the same time, the eyepiece 15 of a smaller focal length is inserted after the combined prism 12. In this case, the real image to be formed by the objective lens 9 is produced adjacent to the entrance surface of the combined prism 12, and the finder magnification is set 1.2 times higher than in the ordinary photography.

The positions of individual lens components of objective lens 9 are not shifted by the conversion of the state of photography, For this reason, the objective lens 9 can be kept in the state where its total length is relatively small as in the ordinary photography, thus doing away with the need for the mechanical changeover mechanism of the objective lens.

As mentioned above, in the panoramic photography, the embodiment does not require the change of the focal length of the objective lens and can diminish the overall length of the finder optical system. Additionally, the intermediate imaging plane FP is made closer to the eyepiece 15, with the resultant favorable aberration and high finder magnification. Further, since the field frame can be laterally lengthened for the wide angle of view, the state of the printed picture brought about by the panoramic photography is easily recognized within the field range. The difference between the positions of the intermediate imaging planes in both photographies makes it possible to separately indicate the parallax correcting frames in the short-distance photography. Thus, in one photography, the indication for the other photography is invisible, with the resultant advantage that there is not any fear of mistaking the photographic range.

Next, reference is made to the examples of arrangements of the finder optical system for realizing the above embodiment. In the state of ordinary photography shown in FIGS. 4A and 4B, the first reflecting prism 10 situated behind the objective lens 9 is disposed, together with the second reflecting prism 11, normal to the optical axis of the objective lens 9. The combined third and fourth reflecting prism 12 located above the prism 11 and the subsequent eyepiece 13, juxtaposed with the eyepiece 15, are arranged at a distance dN–dP between their optical axes. The prisms 10 to 12 constitute a Porro prism. Consequently, the light beam passing through the objective lens 9 is folded perpendicularly in a lateral direction by the first reflecting prism 10 (refer to FIG. 4A), and enters the second reflecting prism 11 spaced the distance dN apart in a horizontal direction (refer to FIG. 4B). Here, the field light forms the real image at the entrance surface of the second reflecting prism 11 through the field frame ωN placed directly before it (the intermediate imaging plane FN). Subsequently, the light beam incident on the second reflecting prism 11 is bent upward at right angles and after being laterally bent again at right angles by the combined prism 12, is further bent in a direction parallel and identical with the light beam passing through the objective lens 9 by the other reflecting surface thereof to travel toward the eyepiece 13. In this way, the light beam arrives at the pupil of the eyepoint 14.

Figure 4A:
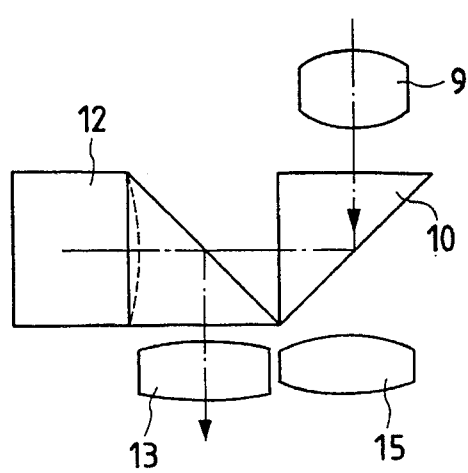
FIGS. 4A and 4B are plan and rear views, respectively, showing a first arrangement example in the state of ordinary photography of the embodiment.
Figure 4B:
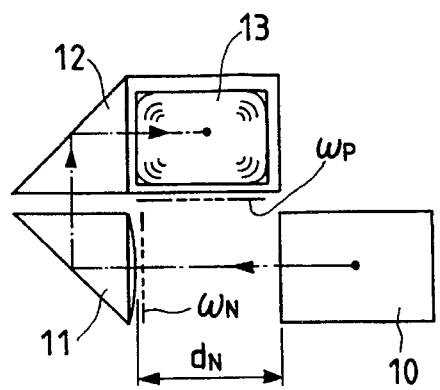
Figure 5A:
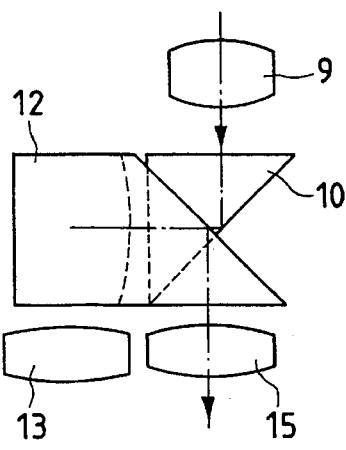
FIGS. 5A and 5B are plan and rear views, respectively, showing the first arrangement example in the state of panoramic photography of the embodiment.
Figure 5B:
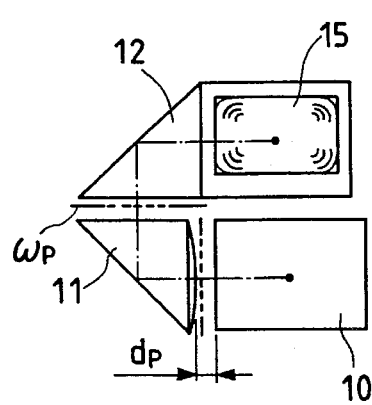

A description is made of the conversion of the state of ordinary photography shown in FIGS. 4A and 4B to the state of panoramic photography shown in FIGS. 5A and 5B. In the state of ordinary photography as shown in FIGS. 4A and 4B, the intermediate imaging plane is placed adjacent to the field frame ωN for ordinary photography. The field frame ωP for panoramic photography is provided outside the finder optical path. The photographer, when seeing through the finder in such a state, can observe the field frame ωN.

When the conversion is carried out from this state to the state of panoramic photography as shown in FIGS. 5A and 5B, the distance between the first reflecting prism 10 and the second reflecting prism 11 is diminished, and the second reflecting prism 11 and the combined third and fourth reflecting prism 12 are moved so that the field frame ωP for panoramic photography is located on the finder optical path connecting the two prisms 11 and 12. That is, in the state of ordinary photography, the field frame ωP is situated so that the distance from its central point to the optical axis traversing the entrance surface of the combined reflecting prism 12 is equal to the distance dN–dP. Thus, as mentioned above, the prisms 11 and 12 are moved horizontally by the distance dN–dP, and thereby the optical axis of the light beam folded perpendicularly by the second reflecting prism 11 traverses the central point of the field frame ωP and the entrance surface of the combined prism 12 (refer to FIG. 5B). The intermediate imaging plane lying adjacent to the field frame ωN in the ordinary photography is shifted toward the eyepiece, corresponding to the decrement of the optical path length between the first reflecting prism 10 and the second reflecting prism 11 which is reduced from the distance dN to the distance dP, and is located in the vicinity of the field frame we. Seeing through the finder from the eyepiece 15 in the state of panoramic photography, the photographer can thus observe the field frame ωP. Also, although in the panoramic photography the field frame ωN is also situated on the finder optical path, the real image of the field frame ωN is not formed on the retina through the eyepiece because of the shift of the intermediate imaging plane.

In this way, by the operation that the two prisms 11 and 12 are slid once, it is possible to convert the ordinary photography to the panoramic photography and to simplify the changeover mechanism. Furthermore, even when the interval changes from the distance dN to the distance dP, the distance along the optical axis of the camera from the first surface to the last surface of the prisms 10, 11, and 12 which constitute the image erecting means remains constant in both photographies, and the overall length of the finder optical system also remains unchanged. Since the intermediate imaging positions in both photographies are different, for example, the parallax correcting frame for microphotography can be provided on the entrance surface of the second reflecting prism 11 for ordinary photography, or on the entrance surface of the combined third and fourth reflecting prism 12 for panoramic photography.

Figure 6A:
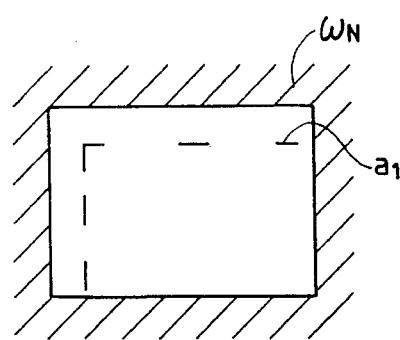
FIGS. 6A and 6B are views showing field frames viewed from a finder in the ordinary and panoramic photographies of the first arrangement example, respectively.
Figure 6B:
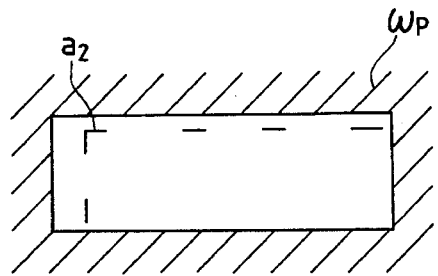
Figure 9A:
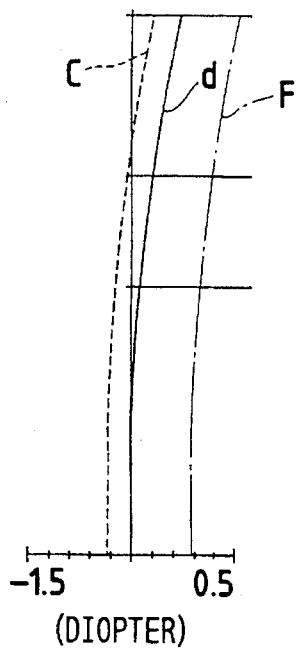
FIGS. 9A, 9B, 9C and 10A, 10B, 10C are diagrams showing spherical aberration, astigmatism, and distortion relative to the wide angle position and the telephoto position, respectively, in the ordinary photography of FIGS. 2A and 2B; and more specifically, FIG. 9A, showing spherical aberration, FIG. 9B showing astigmatism, FIG. 9C showing distortion with ordinary photography in the wide angle position, respectively; and, FIG. 10A showing spherical aberration, FIG. 10B showing astigmatism, and FIG. 10C showing distortion with ordinary photography in the telephoto position, respectively.
Figure 9B:
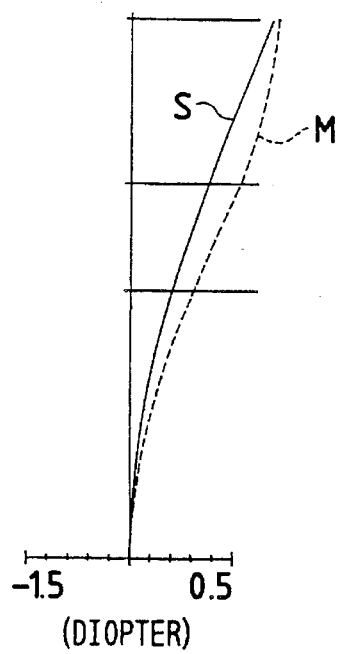
Figure 9C:
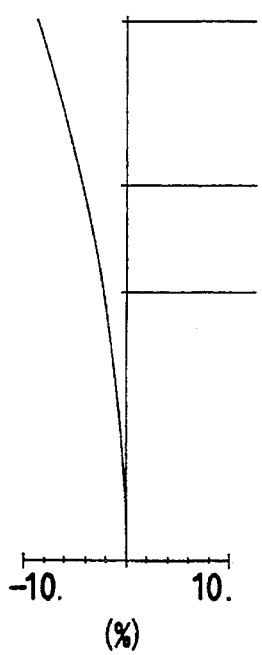
Figure 10A:
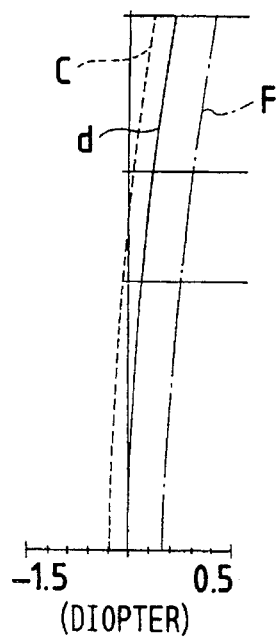
Figure 10B:
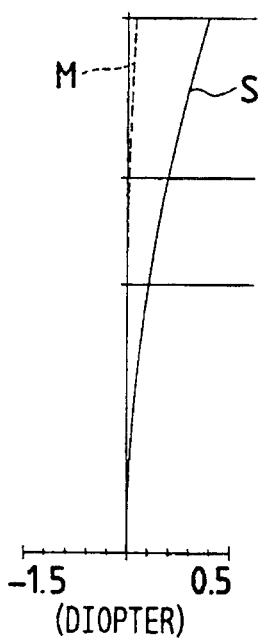
Figure 10C:
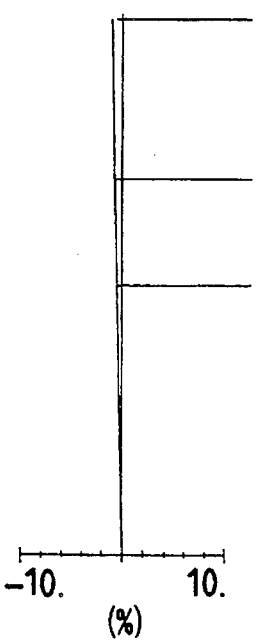
Figure 11A:
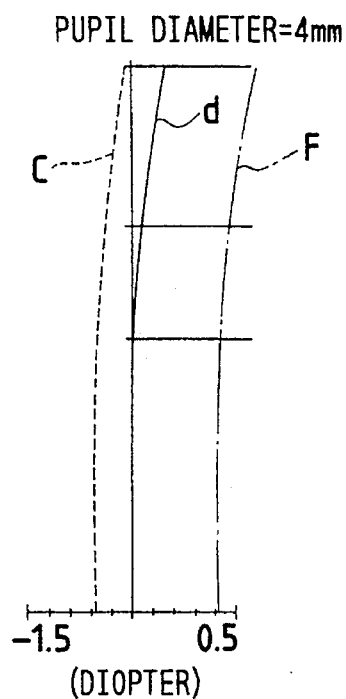
FIGS. 11A, 11B, 11C and 12A, 12B, 12C are diagrams showing aberrations relative to the wide angle position and the telephoto position, respectively, in the panoramic photography of FIGS. 3A and 3B; and more specifically, FIG. 11A showing spherical aberration, FIG. 11B showing astigmatism, and FIG. 11C showing distortion, respectively, with panoramic photography in the wide angle position.
Figure 11B:
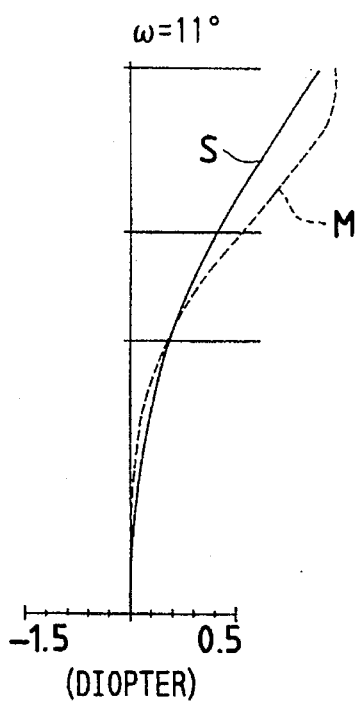
Figure 11C:
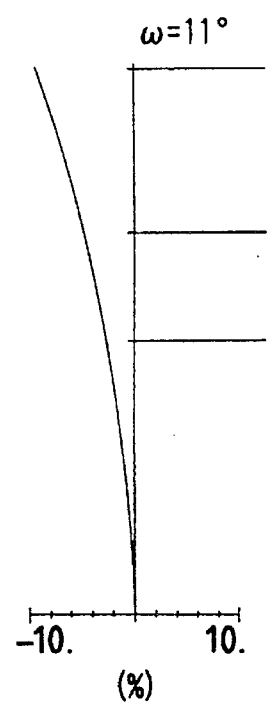
Figure 12A:
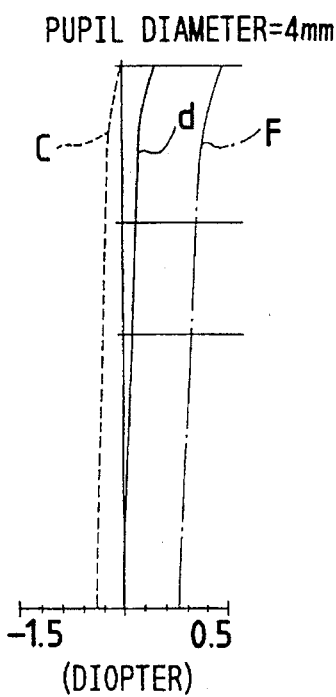
Figure 12B:
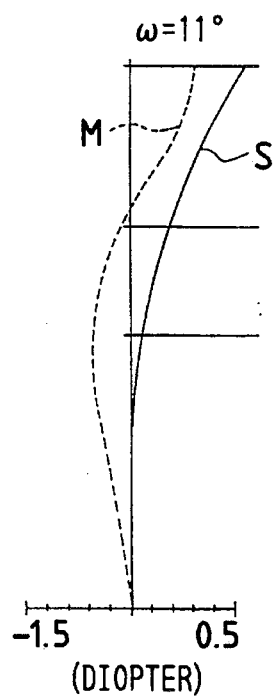
Figure 12C:
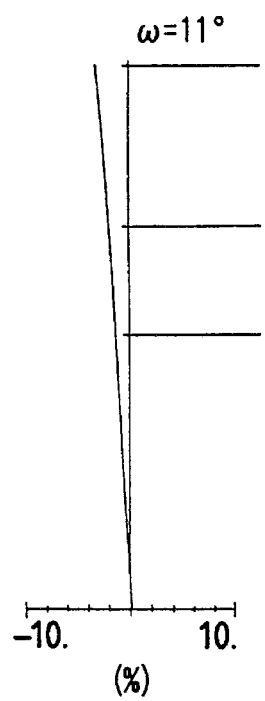

Visible ranges of the field frames where the photographer actually sees through the finder are as shown in FIGS. 6A and 6B. The field frame ωN in the ordinary photography shown in FIG. 6A affords the view of a parallax correcting frame a1 provided on the entrance surface of the second reflecting prism 11, while the field frame ωP in the panoramic photography shown in FIG. 6B offers the view of a parallax correcting frame a2 provided on the entrance surface of the combined prism 12.

Next, referring to FIGS. 7A and 7B and FIGS. 8A and 8B, other examples of arrangements of the finder optical system are explained. In the state of ordinary photography shown in FIGS. 7A and 7B, the first reflecting prism 10 located behind the objective lens 9 and the subsequent second reflecting prism 11 are arranged normal to the optical axis of the objective lens 9. The combined third and fourth reflecting prism 12 which is laterally lengthened and reflects the light upward and rearward is disposed on the exit side of the prism 11, and the two eyepieces 13 and 15 are juxtaposed on the exit side of the prism 12. The arrangement is made such that in the ordinary photography, the second reflecting prism 11 is located beneath the eyepiece 13, whereas in the panoramic photography, it is slid beneath the eyepiece 15. Hence, the light beam passing through the objective lens 9 is bent at right angles in a horizontal direction by the first reflecting prism 10 (refer to FIG. 7A). Subsequently, the beam is incident, through the field frame $\omega$N, on the second reflecting prism 11 spaced the distance $d_N$ apart from the first reflecting prism 10 and is then bent at right angles in a direction parallel and opposite to the beam traversing the objective lens 9 (refer to FIG. 7B). After being bent upward at right angles within the combined prism 12 (refer to FIG. 7C), the beam is again bent horizontally in the same direction as the beam passing through the objective lens 9 to travel through the eyepiece 13.

In the state of panoramic photography shown in FIGS. 8A and 8B, on the other hand, the second reflecting prism 11 is moved horizontally by the distance $d_N - d_P$ so that the interval to the first reflecting prism 10 is reduced from the distance $d_N$ to the distance $d_P$. The combined third and fourth reflecting prism 12 assumes a laterally long shape in the direction of movement of the second reflecting prism 11 and remains stationary in the conversion of photography. Also, the side view of the optical system relative to FIGS. 8A and 8B is the same as FIG. 7C. According to this arrangement, as mentioned above, the conversion of photography can be carried out only by sliding the second reflecting prism 11, and the total lengths of the image erecting means and the finder optical system do not change.

For the finder optical system of the embodiment shown in FIGS. 2A, 2B and 3A, 3B, its numerical data are shown below.

In the embodiment, Eq. (1) is $$f_{1N} m_N / (f_{1P} m_P) = 1.36$$

and Eq. (2) is $$(d_N - d_P)/f_{1N} = 0.33$$

(Ordinary photography)

r1 = −30.4658
    d1 = 1.000    n1 = 1.58362    v1 = 30.37
r2 = 10.5864 (aspherical)
    d2 = D1 (variable)
r3 = 4.4859 (aspherical)
    d3 = 2.650    n2 = 1.49230    v2 = 57.71
r4 = 5.4225
    d4 = D2 (variable)
r5 = 8.9894 (aspherical)
    d5 = 2.800    n3 = 1.49230    v3 = 57.71
r6 = −15.5571
    d6 = D3 (variable)
r7 = ∞
    d7 = 7.500    n4 = 1.49230    v4 = 57.71
r8 = ∞
    d8 = 8.807 ($d_N$)
r9 = 11.8840
    d9 = 9.000    n5 = 1.49230    v5 = 57.71
r10 = ∞
    d10 = 0.500
r11 = ∞
    d11 = 20.800    n6 = 1.49230    v6 = 57.71
r12 = ∞
    d12 = 2.890
r13 = 23.1928 (aspherical)
    d13 = 4.500    n7 = 1.49230    v7 = 57.71
r14 = −24.9130 (aspherical)
    d14 = 15.000
r15 = (eyepoint)

Aspherical coefficients

Second surface
    P = 1.0000,    A4 = −0.51017 × 10⁻³,
    A6 = 0.54430 × 10⁻⁴,    A8 = −0.32024 × 10⁻⁵
Third surface
    P = 1.0000,    A4 = −0.11880 × 10⁻²,
    A6 = −0.12168 × 10⁻⁴,    A8 = −0.80056 × 10⁻⁶
Fifth surface
    P = 1.0000,    A4 = −0.46817 × 10⁻³,
    A6 = −0.66619 × 10⁻⁵,    A8 = 0.50073 × 10⁻⁶
Thirteenth surface
    P = 1.0000,    A4 = −0.33145 × 10⁻³,
    A6 = −0.65046 × 10⁻⁵,    A8 = −0.11819 × 10⁻⁶
Fourteenth surface
    P = 1.0000,    A4 = −0.29939 × 10⁻³,
    A6 = −0.74577 × 10⁻⁵,    A8 = 0.48486 × 10⁻⁷

Zoom data

| | Wide angle position | Telephoto position |
|---|---|---|
| D1 | 7.8313 | 1.7923 |
| D2 | 2.8154 | 2.4018 |
| D3 | 0.4449 | 6.8975 |

(Panoramic photography)

r1 = −30.4658
    d1 = 1.000    n1 = 1.58362    v1 = 30.37
r2 = 10.5864 (aspherical)
    d2 = D1 (variable)
r3 = 4.4859 (aspherical)
    d3 = 2.650    n2 = 1.49230    v2 = 57.71
r4 = 5.4225
    d4 = D2 (variable)
r5 = 8.9894 (aspherical)
    d5 = 2.800    n3 = 1.49230    v3 = 57.71
r6 = −15.5571
    d6 = D3 (variable)
r7 = ∞
    d7 = 7.500    n4 = 1.49230    v4 = 57.71
r8 = ∞
    d8 = 0.700 ($d_P$)
r9 = 11.8840
    d9 = 9.000    n5 = 1.49230    v5 = 57.71
r10 = ∞
    d10 = 0.500
r11 = ∞
    d11 = 20.800    n6 = 1.49230    v6 = 57.71
r12 = ∞
    d12 = 0.279
r13 = 9.9084 (aspherical)
    d13 = 3.806    n7 = 1.49230    v7 = 57.71
r14 = −28.7797
    d14 = 15.000
r15 (eyepoint)

Aspherical coefficients

Second surface
    P = 1.0000,    A4 = −0.51017 × 10⁻³,
    A6 = 0.54430 × 10⁻⁴,    A8 = −0.32024 × 10⁻⁵
Third surface
    P = 1.0000,    A4 = −0.11880 × 10⁻²,
    A6 = −0.12168 × 10⁻⁴,    A8 = −0.80056 × 10⁻⁶
Fifth surface
    P = 1.0000,    A4 = −0.46817 × 10⁻³,
    A6 = −0.66619 × 10⁻⁵,    A8 = 0.50073 × 10⁻⁶
Thirteenth surface
    P = 1.0000,    A4 = −0.27262 × 10⁻³,
    A6 = 0.61195 × 10⁻⁵,    A8 = −0.19702 × 10⁻⁶

-continued

| Zoom data | | |
|---|---|---|
| | Wide angle position | Telephoto position |
| D1 | 7.8313 | 1.7923 |
| D2 | 2.8154 | 2.4018 |
| D3 | 0.4449 | 6.8975 |

In the embodiment mentioned above, r1, r2, . . . represent radii of curvature of individual lens surfaces; d1, d2, . . . thicknesses of individual lenses or spaces therebetween; n1, n2, . . . refractive indices of individual lenses; and v1, v2, . . . Abbe's numbers of individual lenses.

Also, the configurations of aspherical surfaces in the embodiment are expressed by the following equation using the aspherical coefficients:

$$X = (y^2/r)/[1 + \sqrt{1 - Py^2/r^2}] + A_4 y^4 + A_6 y^6 + A_8 y^8$$

where X represents the coordinates in the direction of the optical axis, y the coordinates in the direction normal to the optical axis, r the paraxial radius of curvature, P the conic constant, and A4, A6, and A8 the aspherical coefficients of fourth, sixth, and eighth orders, respectively.

Also, although in the embodiment the objective lens is constructed as a zoom lens, it may well be a single focus lens. Further, the field frame need not necessarily be designed so that its shape varies with the state of photography, and a plurality of field frames of different shapes may be used in respective photographies.

In the arrangements shown in FIGS. 7A to 7C and FIGS. 8A and 8B, the optical path for ordinary photography provided in the prism 12 composed of the third and fourth reflecting surfaces is completely separated from that for panoramic photography. Specifically, the optical path from the objective lens 9, through the prism 10 including the first reflecting surface, to the prism 11 including the second reflecting surface is the same for the ordinary and panoramic photographies. The optical path subsequent to this, however, varies with the state of photography. That is, in the state of ordinary photography, as shown in FIGS. 7A and 7B, the light travels along the optical path of the prism 12 on the side of the eyepiece 13, while in the state of panoramic photography, as shown in FIGS. 8A and 8B, the light follows the optical path of the prism 12 on the side of the eyepiece 15. Thus, for the third and fourth reflecting surfaces included in the prism 12, the corresponding reflecting surfaces provided in the optical paths on the sides of the eyepieces 13 and 15 can be chosen at will in such a way that they are located at the same position or different positions. Similarly, the shapes of the entrance and exit surfaces of the prism 12 provided in the optical paths on the sides of the eyepieces 13 and 15, even though identical or different, can also be chosen at will. Hence, in the step of design, the entrance and exit surfaces may be shaped to best suit each state of ordinary and panoramic photographies. Further, the entrance and exit surfaces, reflecting surfaces, and material of the prism 12 on the sides of the eyepieces 13 and 15 may well be determined at will so as to bring about optical path lengths suitable for respective states.

What is claimed is:

1. A finder optical system comprising:

a finder objective lens;

image erecting means for erecting an image and including path selecting means being movable for defining a selected optical path through said finder optical system;

a first eyepiece for ordinary photography; and a second eyepiece for panoramic photography adjacent to said first eyepiece, said first eyepiece and said second eyepiece being disposed at different longitudinal positions relative to a longitudinal direction of movement of said path selecting means, wherein a first optical path for ordinary photography and an independent second optical path for panoramic photography are defined after said path selecting means and respectively lead to said first eyepiece and said second eyepiece, said path selecting means being movable in said longitudinal direction along a common optical path for both ordinary photography and panoramic photography and wherein movement thereof enables said selecting means to direct light from said finder objective lens selectively to one of said first optical path for ordinary photography through said first eyepiece and said second optical path for panoramic photography through said second eyepiece.

2. A finder optical system comprising:

a finder objective lens;

image erecting means for erecting an image, including
  i) a first reflecting prism for receiving light after having passed through said finder objective lens, said first reflecting prism having at least one mirror surface; and
  ii) a second reflecting prism formed separately from said first reflecting prism and having at least one mirror surface, said second reflecting prism being constructed and arranged to be able to receive light after having been reflected from said first reflecting prism, said second reflecting prism being movable between an ordinary photography position and a panoramic photography position along an axis;

a first eyepiece for ordinary photography; and a second eyepiece for panoramic photography disposed adjacently to said first eyepiece;

wherein a first optical path for ordinary photography through said first eyepiece and a second optical path for panoramic photography through said second eyepiece are defined after said second reflecting prism and extend in generally parallel, adjacent relation to each other and in generally perpendicular relation with respect to said axis, said second reflecting prism being selectively movable along said axis between said ordinary photography position and said panoramic photography position so as to selectively direct light entering said optical system through said finder objective lens to one of said first optical path for ordinary photography through said first eyepiece and said second optical path for panoramic photography through said second eyepiece.

3. A finder optical system comprising:

a finder objective lens;

image erecting means for erecting an image, including
  i) a first reflecting prism for receiving light after having passed through said finder objective lens, said first reflecting prism having at least one mirror surface;
  ii) a second reflecting prism formed separately from said first reflecting prism and having at least one mirror surface, said second reflecting prism being constructed and arranged to be able to receive light after having been reflected from said first reflecting prism, said first reflecting prism being movable between an ordinary photography position and a panoramic photography position along an axis;

a first eyepiece for ordinary photography; and a second eyepiece for panoramic photography disposed adjacently to said first eyepiece;

wherein a first optical path for ordinary photography through said first eyepiece and a second optical path for panoramic photography through said second eyepiece are defined after said first optical path and extend generally in parallel relation to one another and generally perpendicular relation to said axis, said first reflecting prism being movable between said ordinary photography position and said panoramic photography position so as to selectively direct light entering said optical system through said finder objective lens to one of said first optical path for ordinary photography through said first eyepiece and said second optical path for panoramic photography through said second eyepiece, said second reflecting prism being fixedly disposed and having a mirror surface thereof being constructed and arranged to be in each of said first optical path and said second optical path.

4. The finder optical system according to any one of claims 1, 2 or 3, wherein said second eyepiece has a focal length different from a focal length of said first eyepiece.

5. The finder optical system according to any one of claims 1, 2 or 3, satisfying a condition $$1 \leq f_{in} \cdot m_N/(f_{ip} \cdot m_P) \leq 2$$

where $f_{lN}$ is the focal length of said first eyepiece, $f_{lP}$ is the focal length of said second eyepiece, $m_N$ is the finder magnification during ordinary photography, and $m_P$ is the finder magnification during panoramic photography.

6. The finder optical system according to claim 3, satisfying a condition $$(d_N - d_P)/f_{LN} \geq 0.15$$

where $d_N$ is the distance between a first reflecting member and a second reflecting member of the image erecting means during ordinary photography, $d_P$ is the distance between a first reflecting member and a second reflecting member of the image erecting means during panoramic photography, and $f_{LN}$ is the focal length of said first eyepiece.

7. The finder optical system according to any one of claims 1, 2 or 3, further comprising a first field frame for ordinary photography disposed in said first optical path, and a second field frame for panoramic photography disposed in said second optical path, said first field frame and said second field frame having different shapes.

8. A finder optical system as claimed in claim 3, wherein said path selecting means is in the form of a prism.

* * * * *